US008570893B2

(12) United States Patent
Guo et al.

(10) Patent No.: US 8,570,893 B2
(45) Date of Patent: Oct. 29, 2013

(54) METHOD AND DEVICE FOR MEASURING NETWORK PERFORMANCE PARAMETERS

(75) Inventors: Xinchun Guo, Guangdong (CN); Jian Li, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 296 days.

(21) Appl. No.: 13/093,438

(22) Filed: Apr. 25, 2011

(65) Prior Publication Data

US 2011/0199929 A1    Aug. 18, 2011

Related U.S. Application Data (63) Continuation of application No. PCT/CN2009/074404, filed on Oct. 12, 2009.

(30) Foreign Application Priority Data

Oct. 25, 2008  (CN) .......................... 2008 1 0216973

(51) Int. Cl.
 *H04L 12/26* (2006.01)
(52) U.S. Cl.
 USPC ........... 370/252; 370/242; 370/229; 370/241; 370/216
(58) Field of Classification Search
 USPC .............. 370/252, 242, 229, 216, 228, 241.1, 370/250, 244, 214, 218, 389
 See application file for complete search history.

(56) References Cited

U.S. PATENT DOCUMENTS

| 7,860,981 | B1 * | 12/2010 | Vinokour et al. | 709/227 |
|---|---|---|---|---|
| 8,111,611 | B2 * | 2/2012 | Kapoor et al. | 370/216 |
| 8,208,372 | B2 * | 6/2012 | Vasseur et al. | 370/225 |
| 8,374,164 | B2 * | 2/2013 | Nadeau et al. | 370/351 |
| 2003/0206517 | A1 | 11/2003 | Grenot et al. | |
| 2008/0159287 | A1 * | 7/2008 | Nagarajan et al. | 370/392 |
| 2009/0016233 | A1 * | 1/2009 | Lu | 370/252 |

FOREIGN PATENT DOCUMENTS

| CN | 1933431 A | 3/2007 |
|---|---|---|
| CN | 101247288 A | 8/2008 |
| EP | 1 487 152 A1 | 12/2004 |
| EP | 1 931 084 A1 | 6/2008 |
| KR | 20080021493 | 3/2008 |

OTHER PUBLICATIONS

D O'Connor, Packet Transport OAM—Service Provider Alternatives, National Fiber Optic Engineers Confenerence, 2007—opticsinfobase.org, pp. 1-10.*

D. Katz, et al., "Bidirectional Forwarding Detection", draft-katz-ward-bfd-01.txt, Network Working Group, Aug. 2003, 29 pages.

(Continued)

*Primary Examiner* — Rasheed Gidado (57) ABSTRACT

A method and a device for measuring network performance parameters are disclosed. The method includes: receiving an extended bidirectional forwarding detection (BFD) packet that includes a packet loss monitoring Type-Length-Value (TLV) and/or a time delay monitoring TLV; and calculating network performance parameters according to the packet loss monitoring TLV and/or the time delay monitoring TLV in the received extended BFD packet. The device includes: an extended BFD packet receiving module and a network performance parameter calculating module. The method and the device enables the calculating of network performance parameters and the monitoring of network performance, and therefore the problem of monitoring network performance in technical solutions in the prior art is solved.

16 Claims, 6 Drawing Sheets

(56) References Cited

OTHER PUBLICATIONS

Extended European Search Report dated Dec. 14, 2011 in connection with European Patent Application No. 09 821 565.0.
International Search Report dated Jan. 21, 2010 in connection with International Patent Application No. PCT/CN2009/074404.
Written Opinion of the International Searching Authority dated Jan. 21, 2010 in connection with International Patent Application No. PCT/CN2009/074404.
Translation of Office Action dated Sep. 26, 2011 in connection with Chinese Patent Application No. 200810216973.3.
Communication pursuant to Article 94(3) EPC dated Mar. 27, 2013 in connection with European Patent Application No. 09 821 565.0.
Huub van Helvoort, "Recommendation Y.1373/G.8114 including LC comment resolutions", Rapporteur Q5/13, Telecommunication Standardization Sector, Jan. 14-25, 2008, 61 pages.
"Operation & maintenance mechanism for T-MPLS layer networks", ITU-T Recommendation Y.1373/G.8114, Dec. 13, 2007, 60 pages.

* cited by examiner

METHOD AND DEVICE FOR MEASURING NETWORK PERFORMANCE PARAMETERS

CROSS-REFERENCE TO RELATED APPLICATIONS

This application is a continuation of International Application No. PCT/CN2009/074404, filed on Oct. 12, 2009, which claims priority to Chinese Patent Application No. 200810216973.3, filed on Oct. 25, 2008, both of which are hereby incorporated by reference in their entireties.

TECHNICAL FIELD

The present invention relates to the field of network communication, and in particular, to a method and device for measuring network performance parameters.

BACKGROUND

Bidirectional forwarding detection (BFD) is a set of international standard protocols for implementing fast detection, which provides detection with light load and short duration. The BFD detects link states in two directions by transmitting a detection packet at two ends of a bidirectional link simultaneously, so as to implement link failure detection in the level of milliseconds. A special case of a bidirectional link is a unidirectional link, for example, a label switched path (LSP). At this time, a BFD control packet needs to be transmitted in one direction only, and the peer end reports the link state through other paths.

The BFD allows failure detection on any types of channels between systems, where the channels include a direct physical link, a virtual circuit, a tunnel, a multi-protocol label switching (MPLS) LSP, a multi-hop route channel, and an indirect channel. Meanwhile, as the failure detection implemented by the BFD is simple and sole, the BFD is able to focus on fast detection of forwarding failures to help networks to transmit voice, video, and other on-demand services with a good quality of service (QoS), and help service providers offer, based on IP networks, Voice over Internet Protocol (VoIP) service with high reliability and high applicability and other real-time services required by their customers.

The BFD protocol describes two bidirectional detection mechanisms: an asynchronous mode and a query mode. In addition, an auxiliary echo function can be used in combination with these two modes. The essential difference between the asynchronous mode and the query mode is the detection position. In the asynchronous mode, the local end transmits a BFD control packet periodically, and the remote end needs to detect the BFD control packet transmitted by the local system, while in the query mode, the local system detects the BFD control packet transmitted by the local end.

Although the BFD detection can detect a connection state of a link, it cannot detect a quality problem of the link.

Multi-Protocol Label Switching transport profile (MPLS-TP) is a new MPLS protocol prototype based on Transport MPLS (T-MPLS) and Internet Engineering Task Force (IETF) MPLS. The requirements of an MPLS-TP network include contents in various aspects such as Operation, Administration, Maintenance (OAM), forwarding, control, management, and survivability, where the OAM is an important aspect of the transmission-oriented. MPLS-TP network. The MPLS-TP network has strict requirements for OAM tools: The OAM tools must measure performance parameters of the network such as packet loss, time delay, and jitter, and the QoS of the network is monitored by using the performance parameters. However, in the prior art, the network performance parameters are unable to be measured.

SUMMARY

Embodiments of the present invention provide a method and device for measuring network: performance parameters with extended BFD, so as to solve the problem in technical solutions in the prior art that network performance parameters are unable to be measured.

The objectives of the present invention are achieved through the following technical solutions.

An embodiment of the present invention provides a method for measuring network performance parameters, where the method includes:

receiving an extended. BFD packet that includes a packet loss monitoring Type-Length-Value (TLV) and/or a time delay monitoring TLV; and calculating network performance parameters according to the packet loss monitoring TLV and/or the time delay monitoring TLV in the received extended BFD packet.

An embodiment of the present invention provides a device for measuring network performance parameters, where the device includes:

an extended BFD packet receiving module, configured to receive an extended BFD packet that includes a packet loss monitoring TLV and/or a time delay monitoring TLV; and a network performance parameter calculating module, configured to calculate network performance parameters according to the packet loss monitoring TIN and/or the time delay monitoring TLV in the extended BFD packet.

With the technical solutions provided in the present invention, since an extended BFD packet carries a packet loss monitoring TLV or a time delay monitoring TLV, various network performance parameters can be calculated, thereby solving the problem in technical solutions in the prior art that network: performance parameters are unable to be measured.

DETAILED DESCRIPTION

In embodiments of the present invention, existing equipment are enabled to support the processing of an extended BFD packet by changing hardware of the equipment and/or upgrading software of the equipment.

Fields of a BFD packet have different meanings. For example, when a Poll (P) field is set to 1, it indicates that a transmitting system requests confirmation of a connection or confirmation of parameter change, and when the P field is set to 0, it indicates that the transmitting system does not request confirmation. When an Authentication Present (A) field is set to 1, it indicates that a control packet includes an A field, and a session needs to be authenticated, and when the A field is set to 0, it indicates that the control packet does not include the A field, and the session does not need to be authenticated. A Diagnostic (Diag) part may have a value between 0 and 31, an existing BFD packet defines the meaning of the Diag field having the value between 0 and 8, and the Diag field having the value between 9 and 31 is a reserved field for further extension.

An embodiment of the present invention is provided in the following with reference to FIGS. 1 to 4.

Figure 1:
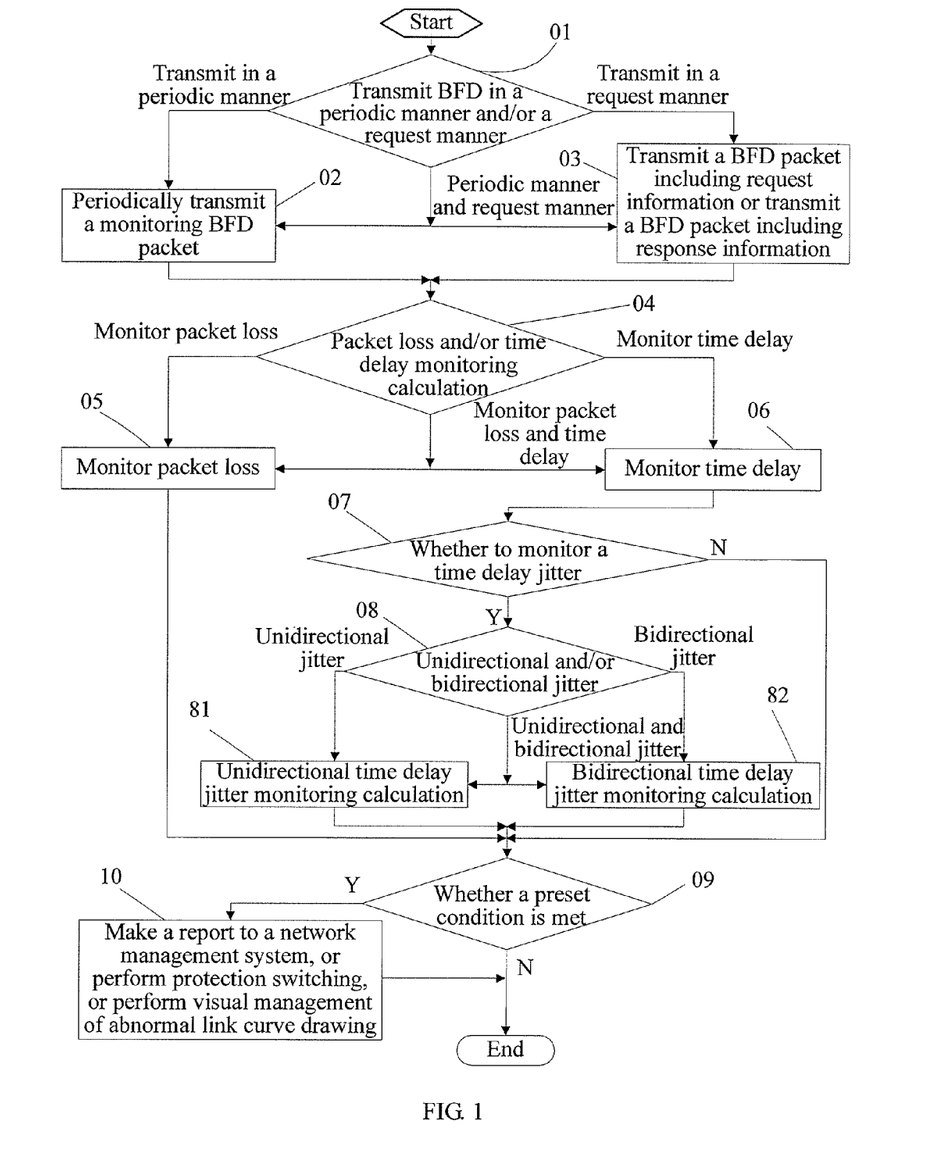
FIG. 1 is a flow chart of a method for measuring network performance parameters according to an embodiment of the present invention.

FIG. 1 is a flow chart of a method for measuring network performance parameters according to an embodiment of the present invention. The method includes the following steps.

A first device for measuring network performance parameters receives an extended BFD packet transmitted by a second device for measuring network performance parameters, where the extended BFD packet includes a packet loss monitoring TLV and/or a time delay monitoring TLV.

The first device for measuring network performance parameters calculates network performance parameters according to the packet loss monitoring TLV and/or the time delay monitoring TLV in the received extended BFD packet.

The method for measuring network performance parameters specifically includes the following steps.

In step 01, a mechanism for implementing bidirectional detection with BFD is selected, and a periodic manner or a request manner for transmitting BFD and network performance parameters to be monitored are determined through negotiation. The network performance parameters include a near-end packet loss, a far-end packet loss, a unidirectional time delay, a bidirectional time delay, a unidirectional time delay jitter, or a bidirectional time delay jitter. If BFD is transmitted in a periodic manner, step 02 is performed; if BFD is transmitted in a request manner, step 03 is performed; if BFD is transmitted in a periodic manner and a request manner, both steps 02 and 03 are performed.

In step 02, if BFD is transmitted in a periodic manner, the first device for measuring network performance parameters and the second device for measuring network performance parameters periodically transmit an extended BFD packet including a packet loss monitoring TLV and/or a time delay monitoring TLV.

In step 03, if BFD is transmitted in a request manner, the first device for measuring network performance parameters transmits according to requirements a BFD packet including request information, and the second device for measuring network performance parameters transmits the BFD packet including response information when receiving the BFD packet including the request information. Similarly, the second device for measuring network performance parameters may also transmit according to requirements a BFD packet including request information, and the first device for measuring network performance parameters transmits the BFD packet including response information when receiving the BFD packet including the request information.

The extended BFD packet carries a packet loss monitoring TLV or a time delay monitoring TLV or both the packet loss monitoring TLV and the time delay monitoring TLV.

A value field of the packet loss monitoring TLV includes a transmit sequence number (Sequence) of the extended BFD packet, a transmit count, a receive count, and a return count. The transmit count is specifically the number of preset type packets that have been transmitted when the extended BFD packet is transmitted (TxPacketCounter_L). The preset type packets include all transmitted packets, or all transmitted data packets, or packets including specified features, or packets transmitted at a specified time. The manner of counting the number of the preset type packets that are transmitted may be set according to requirements to count all the transmitted packets, or all the transmitted data packets, or only the packets including the specified features, or only the packets transmitted at the specified time. The receive count is the number of the preset type packets that have been received when the extended BFD packet is received last time (RxPacketCounter_L). The return count is the value of the transmit count in the extended BFD packet received last time (TxPacketCounter_F). When it is not necessary to check a sequence number, the transmit sequence number (Sequence) may be set to 0; when it is not necessary to monitor the far-end packet loss, the receive count (RxPacketCounter_L) and the return count (TxPacketCounter_F) may be set to 0.

A value field of the time delay monitoring TLV includes a transmit sequence number (Sequence) of the extended BFD packet, a transmit timing, a receive timing, and a return timing. The transmit timing is specifically a local time when the extended BFD packet is transmitted (TxTimeStamp_L); the receive timing is specifically a local time when the extended BFD packet is received last time (RxTimeStamp_L); and the return timing is specifically the transmit timing of the extended BFD packet received last time (TxTimeStamp_F). When it is not necessary to check a sequence number, the transmit sequence number (Sequence) may be set to 0; when it is not necessary to monitor a round-trip time delay, the receive timing (RxTimeStamp_L) and the return timing (TxTimeStamp_F) may be set to 0.

In embodiments of the present invention, a field of the extended BFD packet is set to mark that the extended BFD packet includes the packet loss monitoring TLV and/or the time delay monitoring TLV, which is specifically as follows:

a P field of the extended BFD packet may be set, for example, the P field is set to 1, so as to mark that the extended BFD packet includes the packet loss monitoring TLV and/or the time delay monitoring TLV; or an A field of the extended BFD packet is set, for example, the A field is set to 1, so to mark that the extended BFD packet includes the packet loss monitoring TLV and/or the time delay monitoring TLV; or a reserved field of a diag part in the BFD packet is set, for example, the reserved field of the diag part is defined, so as to mark that the extended BFD packet includes the packet loss monitoring TLV and/or the time delay monitoring TLV.

In an MPLS-TP network, it is further necessary to encapsulate an extended BFD packet before the extended BFD packet is transmitted, that is, before being transmitted, the extended BFD is encapsulated with a Generic Associated Channel Header (GE-ACH) defined in the MPLS-TP. If network performance parameters of an MPLS LSP are measured, it is further necessary to encapsulate the extended BFD with a Label for yoU (LFU) defined in the MPLS-TP before the extended BFD is transmitted.

After receiving the extended BFD packet transmitted by the second device for measuring network performance parameters, the first device for measuring network performance parameters calculates network performance parameters according to the packet loss monitoring TLV and/or the time delay monitoring TLV in the received extended BFD packet.

The calculating the network performance parameters according to the packet loss monitoring TLV and/or the time delay monitoring TLV in the received extended BFD packet specifically includes the following steps.

In step 04, it is chosen to monitor a packet loss or a time delay or to monitor both the packet loss and the time delay, according to the network performance parameters to be monitored, where the network performance parameters to be monitored are determined through negotiation. When both the packet loss and the time delay are monitored, the packet loss may be monitored first, and then the time delay is monitored; or, the time delay may be monitored first, and then the packet loss is monitored. If the packet loss is monitored, step 05 is performed; if the time delay is monitored, step 06 is performed; if both the packet loss and the time delay are monitored, both steps 05 and 06 are performed.

In step 05, the packet loss is monitored, where the first device for measuring network performance parameters or the second device for measuring network performance parameters calculates the number of packet losses of preset type packets between two extended BFD packets, and the two extended BFD packets may be two adjacent extended BFD packets or two arbitrary extended BFD packets.

Figure 2:
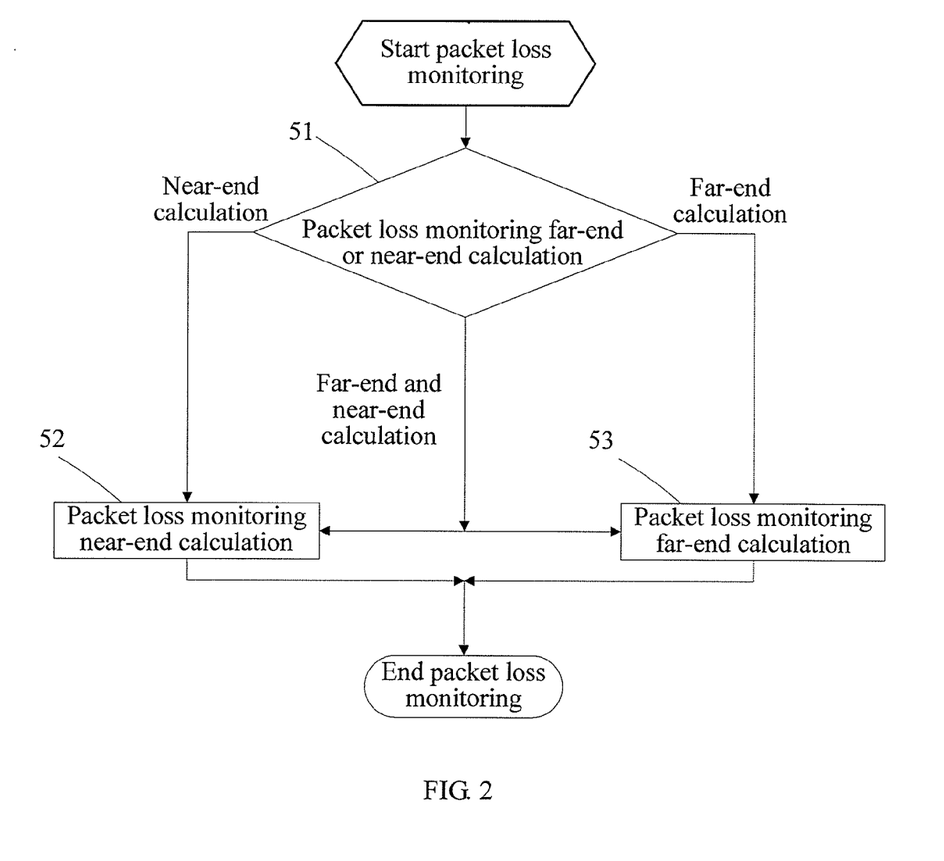
FIG. 2 is a flow chart of a method for monitoring a packet loss according to an embodiment of the present invention.

FIG. 2 is a flow chart of a method for monitoring the packet loss in step 05. The method specifically includes the following steps.

In step 51, it is determined to employ packet loss monitoring near-end calculation and/or packet loss monitoring far-end calculation to monitor the packet loss. If the packet loss monitoring near-end calculation is employed, step 52 is performed; if the packet loss monitoring far-end calculation is employed, step 53 is performed; if both the packet loss monitoring near-end calculation and the packet loss monitoring far-end calculation are performed, both steps 52 and 53 are performed.

The network performance parameters to be monitored are determined through negotiation. According to the network performance parameters to be monitored, it is possible that only the packet loss monitoring near-end calculation or the packet loss monitoring far-end calculation is performed, and it is also possible that both the packet loss monitoring near-end calculation and the packet loss monitoring far-end calculation are performed. When both the packet loss monitoring near-end calculation and the packet loss monitoring far-end calculation are performed, the packet loss monitoring near-end calculation may be performed first, and then the packet loss monitoring far-end calculation is performed; or, the packet loss monitoring far-end calculation may be performed first, and then the packet loss monitoring near-end calculation is performed.

In step 52, the packet: loss monitoring near-end calculation is performed, where a near-end packet loss is calculated, and the near-end packet loss indicates the number of packet losses between two extended BFD packets BFD1 and BFD2 received by calculating equipment. The near-end packet loss Packet Loss [near-end]=|TxPacketCounter_L[BFD1]−TxPacketCounter_L [BFD2]|−|RxPacketCounterL [BFD1]−RxPacketCounterL [BFD2]|, where RxPacketCounterL is the number of packets that have been received by the calculating equipment when the extended BFD packet BFD1 or BFD2 is received.

In step 53, the packet loss monitoring far-end calculation is performed, where a far-end packet loss is calculated, and the far-end packet loss indicates the number of packet losses between two extended BFD packets BFD1 BFD2 transmitted by the calculating equipment. The far-end packet loss Packet Loss [far-end]=|TxPacketCounter_F [BFD1]−TxPacketCounter_F [BFD2]|−|RxPacketCounter_L [BFD1]−RxPacketCounter_L [BFD2]|. When it is not necessary to check a sequence number, the transmit sequence number (Sequence) is set to 0, at this time, the packet loss monitoring TLV does not have the transmit sequence number, and it cannot be judged whether the extended BFD packet is lost, so it is unable to judge by using the sequence number whether the return counts (TxPacketCounter_F) of the two extended BFD packets are received from the same extended BFD packet. Therefore, if the return counts (TxPacketCounter_F) of the two extended BFD packets BFD1 and BFD2 are equal, it is considered that the peer end transmits no packet or a performance measuring packet transmitted by the peer end is lost in this period of time, in order to avoid errors in this calculation, the calculation is abandoned.

In step 06, the time delay is monitored, where a time delay of the extended BFD packet is calculated.

Figure 3:
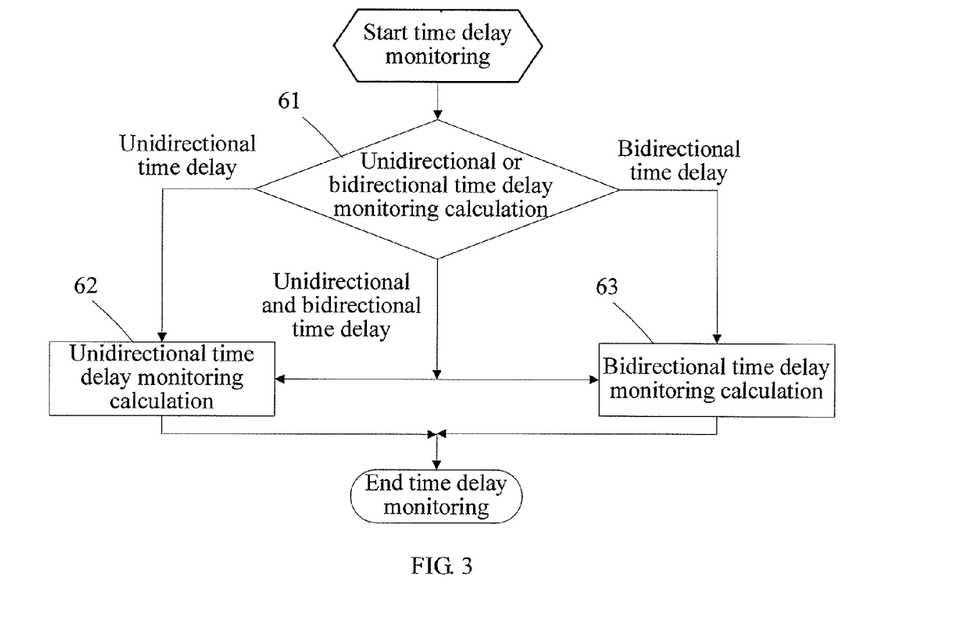
FIG. 3 is a flow chart of a method for monitoring a time delay according to an embodiment of the present invention.

FIG. 3 is a flow chart of a method for monitoring the time delay in step 06. The method specifically includes the following steps.

In step 61, it is determined to employ unidirectional time delay monitoring calculation and/or bidirectional time delay monitoring calculation to monitor the time delay. If the unidirectional time delay monitoring calculation is employed, step 62 is performed; if the bidirectional time delay monitoring calculation is employed, step 63 is performed; if both the unidirectional time delay monitoring calculation and the bidirectional time delay monitoring calculation are performed, both steps 62 and 63 are performed.

The network performance parameters to be monitored are determined through negotiation. According to the network performance parameters to be monitored, it is possible that only the unidirectional time delay monitoring calculation or the bidirectional time delay monitoring calculation is performed, and it is also possible that both the unidirectional time delay monitoring calculation and the bidirectional time delay monitoring calculation are performed. When both the unidirectional time delay monitoring calculation and the bidirectional time delay monitoring calculation are performed, the unidirectional time delay monitoring calculation may be performed first, and then the bidirectional time delay monitoring calculation is performed; or, the bidirectional time delay monitoring calculation may be performed first, and then the unidirectional time delay monitoring calculation is performed.

In step 62, the unidirectional time delay monitoring calculation is performed, where a unidirectional time delay of the extended BFD packet is calculated, and the unidirectional time delay indicates a time delay from transmitting the packet at the peer end to receiving the packet at the local end. The unidirectional time delay is equal to a sum of a difference between a local time when the extended BFD packet is received and a transmit timing (TxTimeStamp_L) of the extended BFD packet and a time difference of a transmitting end and a receiving end. When the network supports strict clock synchronization, the time difference of the transmitting end and the receiving end is zero, so that the unidirectional time delay is equal to the difference between the local time when the extended BFD packet is received and the transmit timing of the extended BFD packet.

In step 63, the bidirectional time delay monitoring calculation is performed, where a bidirectional time delay of the extended BFD packet is calculated. The bidirectional time delay in a query mode indicates a sum of a time delay of transmitting the packet from the local end to the peer end and a time delay of responding by the peer end and returning the packet to the local end for reception. The bidirectional time delay in an asynchronous mode indicates a sum of a time delay of transmitting the packet from the local end to the peer end and a time delay of the first packet, transmitted by the peer end after receiving the packet transmitted by the local end, arriving at the local end. The bidirectional time delay Packet Delay [two-way]=(RxTimea-TxTimeStamp_L)−(TxTimeStamp_F−RxTimeStamp_L), where RxTimea is a local time when the extended BFD packet is received.

In step 07, it is judged whether to monitor a time delay jitter according to the network performance parameters to be monitored, where the network performance parameters to be monitored are determined by negotiation. If it is judged to monitor the time delay jitter, step 08 is performed; if it is judged not to monitor the time delay jitter, step 09 is performed.

In step 08, unidirectional time delay jitter monitoring calculation and/or bidirectional time delay jitter monitoring calculation is employed to monitor the time delay jitter. If the unidirectional time delay jitter monitoring calculation is employed, step 81 is performed; if the bidirectional time delay jitter monitoring calculation is employed, step 82 is performed; if both the unidirectional time delay monitoring calculation and the bidirectional time delay monitoring calculation are performed, both steps 81 and 82 are performed.

During the time delay jitter monitoring calculation, it may be chosen to perform unidirectional or bidirectional jitter calculation, that is, it is possible that only the unidirectional time delay jitter monitoring calculation or the bidirectional time delay jitter monitoring calculation is performed, and it is also possible that both the unidirectional time delay jitter monitoring calculation and the bidirectional time delay jitter monitoring calculation are performed. When both are performed, the unidirectional time delay jitter monitoring calculation may be performed first, and then the bidirectional time delay jitter monitoring calculation is performed; or, the bidirectional time delay jitter monitoring calculation may be performed first, and then the unidirectional time delay jitter monitoring calculation is performed.

In step 81, the unidirectional time delay jitter monitoring calculation is performed, which is specifically calculating a difference between results of two times of unidirectional time delay monitoring calculation.

In step 82, the bidirectional time delay jitter monitoring calculation is performed, which is specifically calculating a difference between results of two times of bidirectional time delay monitoring calculation.

In step 09, after the network performance parameters are calculated (that is, the packet loss parameter and/or the time delay parameter is calculated), the network performance parameters are compared with a preset condition to judge whether the preset condition is met. If the preset condition is met, it is considered necessary to give an alarm to network performance or manage the network performance, and step 10 is performed; if the preset condition is not met, the process ends.

In step 10, a report is made to a network management system, or protection switching is performed, or visual management of abnormal link curve drawing is performed.

The preset condition may be set according to a single item of the network performance parameters.

Taking the packet loss as an example, when the packet loss rate rises to a certain threshold, it is judged that the transmit packet loss is abnormal, and a report may be made to the network management system, or protection switching may be performed, or visual management of abnormal link curve drawing may be performed; or, in order to reduce the influence on the performance, within an allowable range of requirements, when the packet loss rate is higher than the threshold several for several continuous times, a report is made to the network management system, or protection switching is performed, or visual management of abnormal link curve drawing is performed; or when an event that the packet loss rate is higher than the threshold occurs for several times in a fixed period of time, a report is made to the network management system, or protection switching is performed, or visual management of abnormal link curve drawing is performed. The preset condition of the time delay or time delay jitter may also be determined according to the principle.

Or, the preset condition may also be set according to a part or all of the network performance parameters. The example is as follows.

When the performances such as the packet loss, time delay, and jitter are measured together, the overall performance of the link may be controlled as a whole according to strictness of requirements of different services for performance parameters such as the packet loss, time delay, and jitter while giving consideration to various additional requirements of the services for the performance. For example, voice services have strict requirements for the time delay and less strict requirements for the packet loss. At this time, the measuring weight of the time delay may be set to be greater, and the measuring weight of the packet loss may be set to be lighter in parameter processing. Different measuring weights are set for the parameters according to various service requirements with emphasis on different aspects while the performance of the link is controlled as a whole. The link performance parameters are set within a certain range, and when the overall performance parameter value of the link obtained through accumulation in a set period of time exceeds a set threshold, or the calculation exceeds the threshold for several continuous times, or an event that the overall performance parameter value of the link is higher than the threshold occurs for several times in a fixed period of time (the overall performance parameter value of the link is cleared to zero each time it becomes higher than the threshold), the link may be considered abnormal, and a report may be made to the network management system, or protection switching may be performed, or visual management of abnormal link curve drawing may be performed.

The above calculation of the overall performance parameter of the link may be specifically performed in the following manner. A maximum range of normal allowable variation, that is, a maximum normal threshold, is set for each parameter such as the packet loss rate, the time delay, and the jitter, where when the parameter varies within this range, the quality of the parameter is not considered abnormal. Next, when a maximum abnormal range allowed for performance monitoring, that is, a maximum abnormal threshold, is set for each parameter, where when the parameter exceeds the maximum abnormal threshold, it is considered that the link already fails or is not within the normal quality performance range. When each parameter such as the packet loss rate, the time delay, and the jitter is between the maximum normal threshold and the maximum abnormal threshold, each parameter is respectively scored based on its departure from the normal range according to a set scoring function, and the principle is: The more serious the departure from the normal range is, the more sever abnormality a corresponding score reflects. The score of each parameter for performance monitoring such as the packet loss, the time delay, and the jitter is respectively multiplied by the respective measuring weight preset for specific services, and the products are added to obtain the overall performance parameter of the link.

Figure 4:
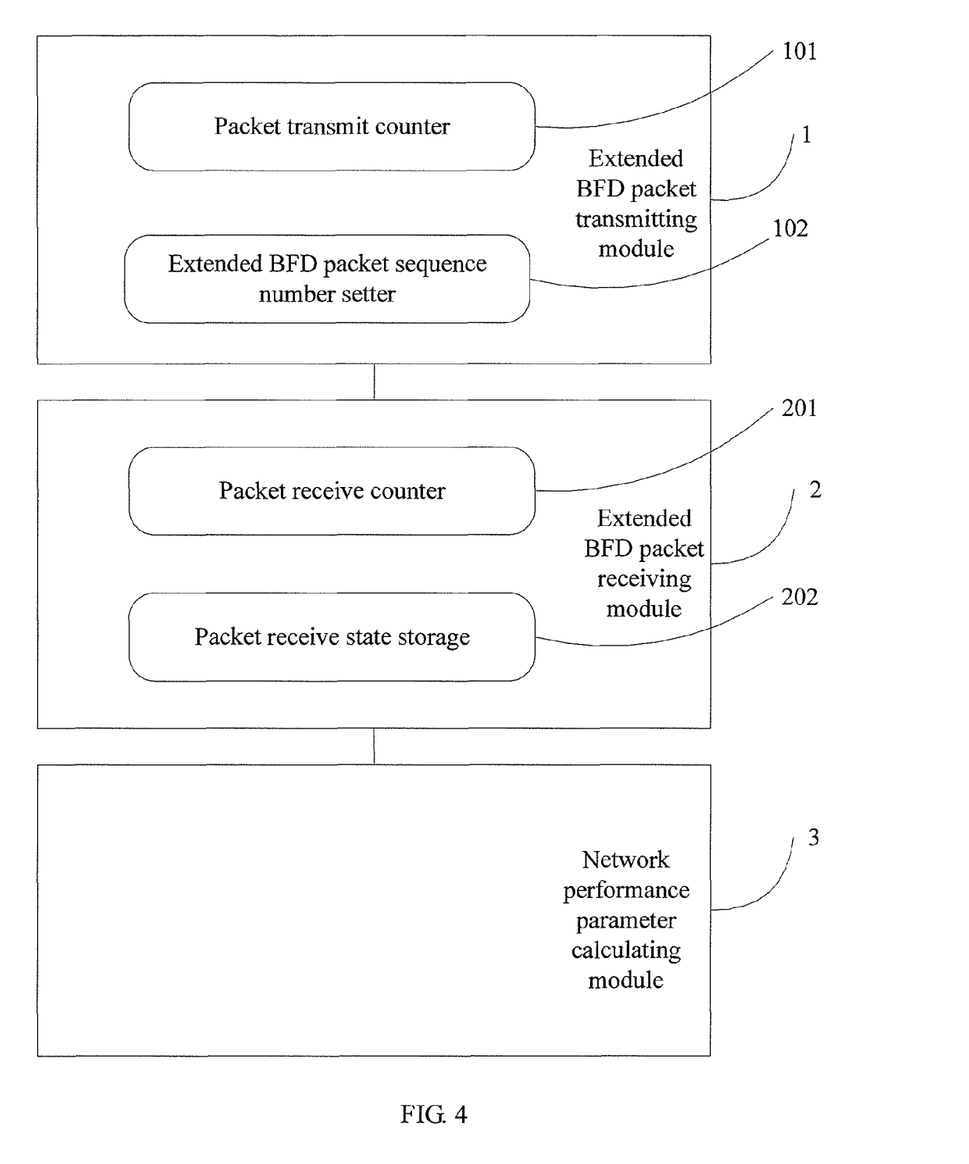
FIG. 4 is a block diagram of a device for measuring network performance parameters according to an embodiment of the present invention.

FIG. 4 is a block diagram of a device for measuring network performance parameters according to an embodiment of the present invention. The device includes an extended BFD packet transmitting module 1, an extended BFD packet receiving module 2, and a network performance parameter calculating module 3.

The extended BFD packet transmitting module 1 is configured to transmit an extended BFD packet including a packet loss monitoring TLV and/or a time delay monitoring TLV.

The extended BFD packet receiving module 2 is configured to receive the extended BFD packet or notify the extended BFD packet transmitting module when receiving the extended BFD packet including request information.

The network performance parameter calculating module 3 is configured to calculate network performance parameters according to the packet loss monitoring TLV and/or the time delay monitoring TLV in the extended BFD packet.

The extended BFD packet transmitting module 1 includes a packet transmit counter 101 and an extended BFD packet sequence number setter 102.

The packet transmit counter 101 is configured to count the number of preset type packets transmitted. In the embodiment of the present invention, each time a preset type packet is transmitted, the number of transmitted packets maintained by the packet transmit counter 101 is added by 1, and when the extended BFD packet is transmitted, the transmit count (TxPacketCounter_L) is read from the packet transmit counter 101.

The extended BFD packet sequence number setter 102 is configured to set a sequence number of the extended BFD packet. In the embodiment of the present: invention, when BFD or a BFD packet including request information is transmitted in a periodic manner, each time an extended BFD packet: is transmitted, an extended BFD packet transmit value maintained by the extended BFD packet sequence number setter 102 is added by 1, and the sequence number (Sequence) of the transmitted extended BFD packet is set to the extended BFD packet transmit value maintained by the extended BFD packet sequence number setter 102. The sequence number of the transmitted extended BFD packet may be set before or after the extended BFD packet transmit value is changed; and when a BFD packet including response information is transmitted, the sequence number includes the sequence number of the BFD packet of the request information.

The extended BFD packet receiving module 2 includes a packet receive counter 201 and a packet receive state storage 202.

The packet receive counter 201 is configured to count the number of preset type packets received. In the embodiment of the present invention, each time a preset type packet is received, a packet receive value maintained by the packet receive counter 201 is added by 1, and the receive count (RxPacketCounter_L) is read from the packet receive counter 201.

The packet receive state storage 202 is configured to store a local time when the extended BFD packet is received and a count value of the packet receive counter 201. The number of packets that have been received by calculating equipment when the extended BFD packet is received (RxPacketCounterL) and a receive timing (RxTimeStamp_L) are read from the packet receive state storage 202.

Another embodiment off the present invention is provided in the following with reference to FIGS. 5 and 6.

Figure 5:
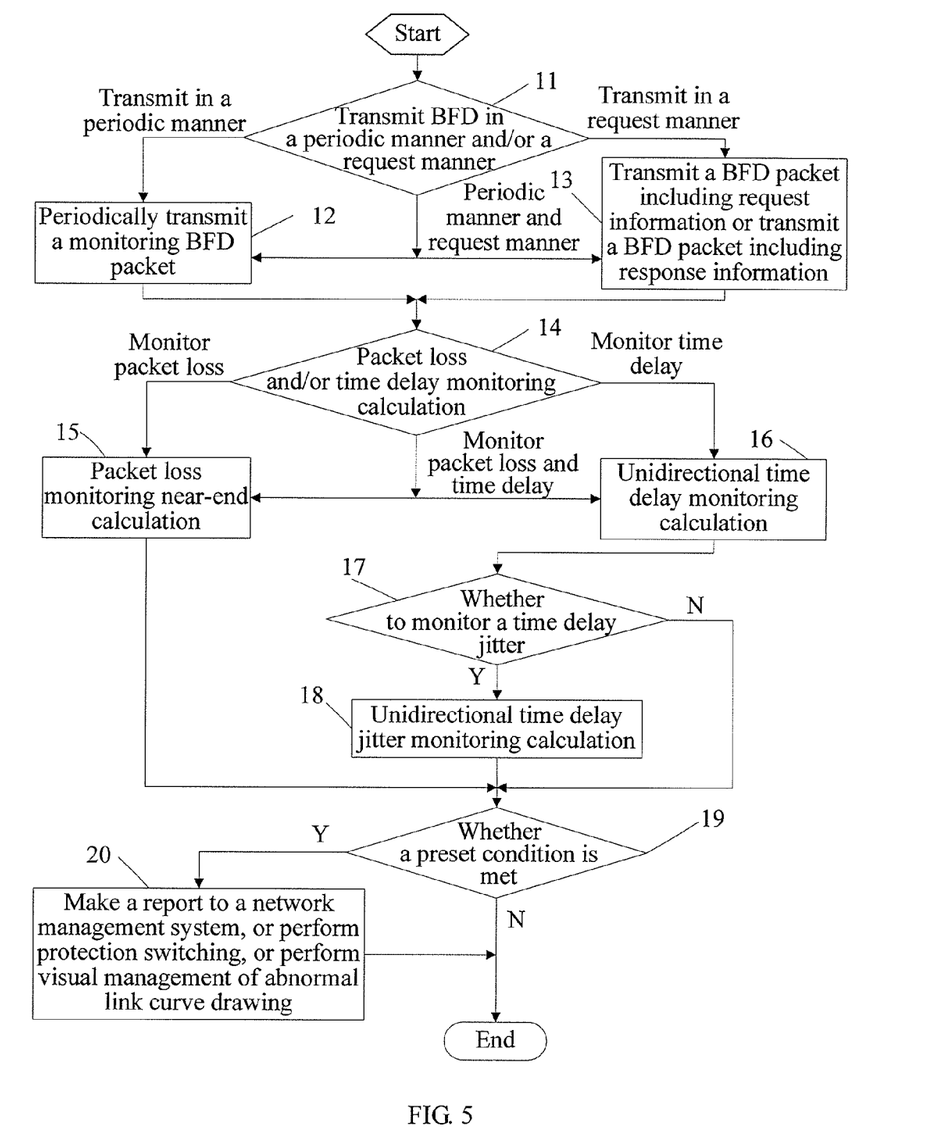
FIG. 5 is another flow chart of a method for measuring network performance parameters according to an embodiment of the present invention.

FIG. 5 is another flow chart of a method for measuring network performance parameters according to an embodiment of the present invention. The method according to the embodiment of the present invention specifically includes the following steps.

In step 11, a mechanism for implementing bidirectional detection of BFD is selected, if BFD is transmitted in a periodic manner, step 12 is performed, if BFD is transmitted in a request manner, step 13 is performed, and if BFD is transmitted in a periodic manner and a request manner, both steps 12 and 13 are performed.

In step 12, BFD is transmitted in a periodic manner.

In step 13, BFD is transmitted in a request manner.

The extended BFD packet carries a packet loss monitoring TLV or a time delay monitoring TLV or both the packet loss monitoring TLV and the time delay monitoring TLV.

A value field of the packet loss monitoring TLV includes a transmit count, which is specifically the number of preset type packets that have been transmitted when the extended BFD packet is transmitted (TxPacketCounter_L). The preset type packets include all transmitted packets, or all transmitted data packets, or packets including specified features, or packets transmitted at a specified time. The manner of counting the number of the preset type packets that are transmitted may be set: to count all the transmitted packets, or all the transmitted data packets, or only the packets including specified features, or only the packets transmitted at specified time.

A value field of the time delay monitoring TLV includes a transmit timing, which is specifically a local time when the extended BFD packet is transmitted (TxTimeStamp_L).

In the embodiment of the present invention, in the case that existing equipment is enabled to support the processing of an extended BFD packet by upgrading software of the equipment, it is necessary to process the extended BFD packet by the software.

In an MPLS-TP network it is further necessary to encapsulate an extended BFD packet before the extended BFD packet is transmitted.

After a first device for measuring network performance parameters receives an extended BFD packet transmitted by a second device for measuring network performance parameters, the first device for measuring network performance parameters calculates network performance parameters according to a packet loss monitoring TLV and/or a time delay monitoring TLV in the received extended BFD packet.

The calculating the network performance parameters according to the packet loss monitoring TLV and/or the time delay monitoring TLV in the received extended BFD packet specifically includes the following steps.

In step 14, it is chosen to monitor a packet loss or a time delay or to monitor both the packet loss and the time delay, according to network performance parameters to be monitored, where the network performance parameters to be monitored are determined through negotiation. When both the packet loss and the time delay are monitored, the packet loss may be monitored first, and then the time delay is monitored; or, the time delay may be monitored first, and then the packet loss is monitored. If the packet loss is monitored, step 15 is performed; if the time delay is monitored, step 16 is performed; if both the packet loss and the time delay are monitored, both steps 15 and 16 are performed.

In step 15, packet loss monitoring near-end calculation is performed, where a near-end packet loss is calculated, and the near-end packet loss indicates the number of packet losses between two extended BFD packets BFD1 and BFD2 received by calculating equipment. The two extended BPD packets may be two adjacent extended BFD packets or two arbitrary extended BFD packets. The near-end packet loss Packet Loss[near-end]=|TxPacketCounter_L[BFD1]−TxPacketCounter_L [BFD2]|−|RxPacketCounterL [BFD1]−RxPacketCounterL [BFD2]|, where RxPacketCounterL is the number of packets that have been received by the calculating equipment when the extended BFD packet BFD1 or BFD2 is received.

In step 16, unidirectional time delay monitoring calculation is performed, where a unidirectional time delay of the extended BFD packet is calculated, and the unidirectional time delay indicates a time delay from transmitting the packet at the peer end to receiving the packet at the local end. The unidirectional time delay is equal to a sum of a difference between a local time when the extended BFD packet is received and a transmit timing (TxTimeStamp_L) of the extended BFD packet and a time difference of a transmitting end and a receiving end. When the network supports strict clock synchronization, the time difference of the transmitting end and the receiving end is zero, so that the unidirectional time delay is equal to the difference between the local time when the extended BFD packet is received and the transmit timing of the extended BFD packet.

In step 17, it is judged whether to monitor a time delay jitter, according to the network performance parameters to be monitored, where the network performance parameters to be monitored are determined through negotiation. If it is judged to monitor the time delay jitter, step 18 is performed; if it is judged not to monitor the time delay jitter, step 19 is performed.

In step 18, unidirectional time delay jitter monitoring calculation is performed, which is specifically calculating a difference between results of two times of unidirectional time delay monitoring calculation.

In step 19, after the network performance parameters are calculated (that is, the packet loss parameter and/or the time delay parameter is calculated), the network performance parameters are compared with a preset condition to judge whether the preset condition is met, where the preset condition may be set according to a single item of the network performance parameters or a part or all of the network performance parameters. If the preset condition is met, it is considered necessary to give an alarm to network performance or manage the network performance, and step 20 is performed; if the preset condition is not met, the process ends.

In step 20, a report is made to a network management system, or protection switching is performed, or visual management of abnormal link curve drawing is performed.

Figure 6:
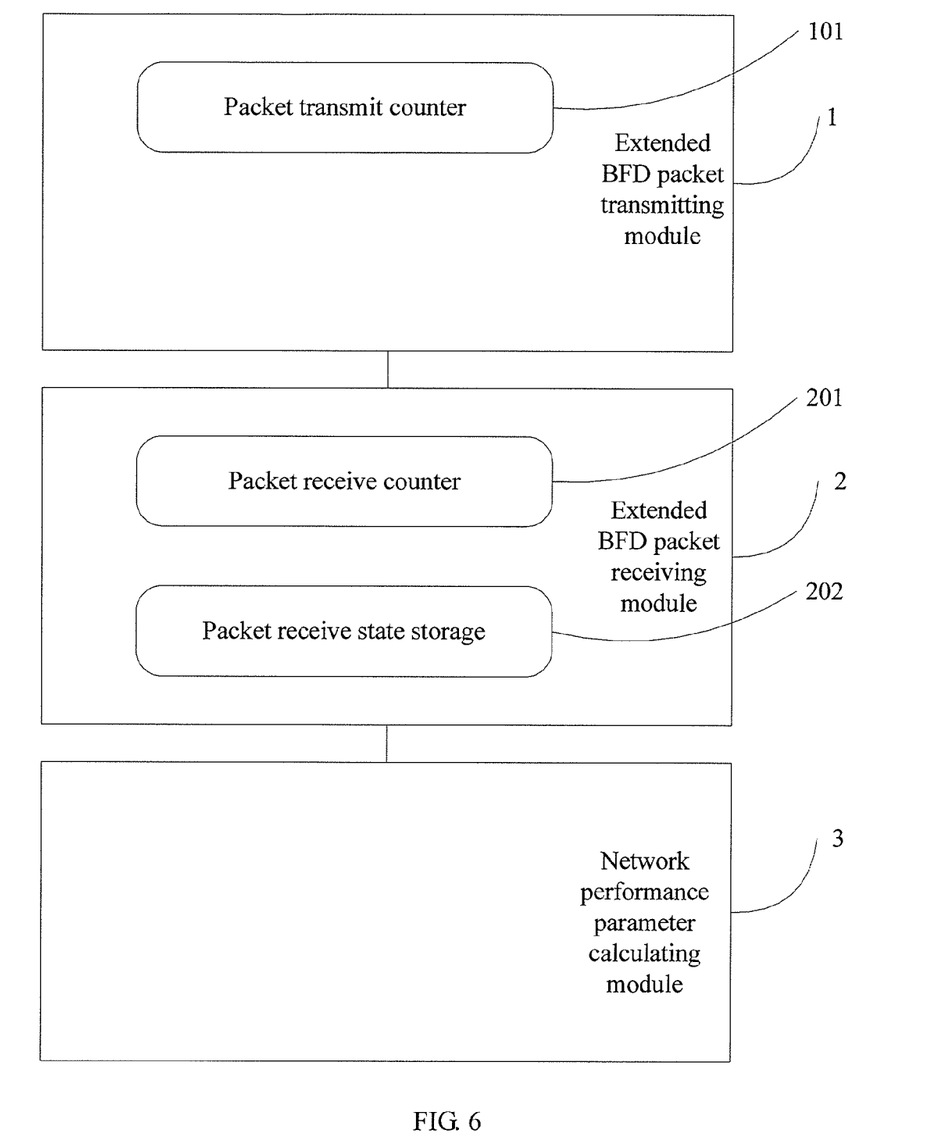
FIG. 6 is another block diagram of a device for measuring network performance parameters according to an embodiment of the present invention.

FIG. 6 is a block diagram of a device for measuring network performance parameters according to an embodiment of the present invention. The device includes an extended BFD packet transmitting module 1, an extended BFD packet receiving module 2, and a network performance parameter calculating module 3.

The extended BFD packet transmitting module 1 is configured to transmit an extended BFD packet including a packet loss monitoring TLV and/or a time delay monitoring TLV.

The extended BFD packet receiving module 2 is configured to receive the extended BFD packet or notify the extended BFD packet transmitting module when receiving the extended BFD packet including request information.

The network performance parameter calculating module 3 is configured to calculate network performance parameters according to the packet loss monitoring TLV and/or the time delay monitoring TLV in the extended BFD packet.

The extended BFD packet transmitting module 1 includes a packet transmit counter 101.

The packet transmit counter 101 is configured to count the number of preset type packets transmitted. In the embodiment of the present invention, each time a preset type packet is transmitted, the number of transmitted packets maintained by the packet transmit counter 101 is added by 1, and when the extended BFD packet is transmitted, the transmit count (TxPacketCounter_L) is read from the packet transmit counter 101, The extended BFD packet receiving module 2 includes a packet receive counter 201 and a packet receive state storage 202.

The packet receive counter 201 is configured to count the number of preset type packets received. In the embodiment of the present invention, each time a preset type packet is received, a packet receive value maintained by the packet receive counter 201 is added by 1.

The packet receive state storage 202 is configured to store a local time when the extended BFD packet is received and a count value of the packet receive counter 201. The number of packets that have been received by calculating equipment when the extended BFD packet is received (RxPacketCounterL) is read from the packet receive state storage 202.

With the technical solutions provided in the embodiments of the present invention, since an extended BFD packet carries a packet loss monitoring TLV or a time delay monitoring TLV, various network performance parameters can be calculated, thereby solving the problem in solutions in the prior art that network performance parameters are unable to be measured. Further, according to a preset condition, the result of network performance monitoring is reported to a network management system, or protection switching is performed, or visual management of abnormal link curve drawing is performed.

Persons of ordinary skill in the art should understand that all or part of the steps of the method according to the embodiments of the present invention may be implemented by a program instructing a relevant forwarding plane. The program may be stored in a computer readable storage medium. The storage medium may be a read-only memory (ROM)/random access memory (RAM), a magnetic disk or an optical disk.

The above descriptions are merely some exemplary embodiments of the present invention. However, the scope of the present invention is not limited to these embodiments. Changes or replacements readily apparent to persons skilled in the prior art within the technical scope of the present invention should fall within the scope of the present invention. Therefore, the protection scope of the present invention is subject to the appended claims.

What is claimed is:

1. A method for measuring network performance parameters, the method comprising:

receiving, by a first device for measuring network performance parameters, an extended bidirectional forwarding detection (BFD) packet transmitted by a second device for measuring network performance parameters, the extended BFD packet comprising a packet loss monitoring Type-Length-Value (TLV) and/or a time delay monitoring TLV; and calculating near-end packet loss according to the packet loss monitoring TLV and/or calculating unidirectional time delay according to the time delay monitoring TLV in the received extended BFD packet;

wherein a value field of the packet loss monitoring TLV comprises a transmit count, and the transmit count is the number of data packets that have been transmitted when the extended BFD packet is transmitted;

wherein a value field of the time delay monitoring TLV comprises a transmit timing, and the transmit timing is a local time when the extended BFD packet is transmitted;

wherein calculating the near-end packet loss is:

a near-end packet loss Packet Loss[near-end]=|TxPacketCounter_L[BFD1]−TxPacketCounter_L [BFD2]|−|RxPacketCounterL [BFD1]−RxPacketCounterL [BFD2]|, wherein TxPacketCounter_L[BFD1] indicates the transmit count of the received extended BFD packet BFD1, TxPacketCounter_L[BFD2] indicates the transmit count of the received extended BFD packet BFD2, RxPacketCounterL[BFD1] indicates the number of data packets that have been received by calculating equipment when the extended BFD packet BFD1 is received, and RxPacketCounterL[BFD2] indicates the number of data packets that have been received by calculating equipment when the extended BFD packet BFD2 is received;

wherein calculating the unidirectional time delay is: adding a difference between a local time when the extended BFD packet is received and the transmit timing of the extended BFD packet and a time difference of the first device and the second device.

2. The method for measuring network performance parameters according to claim 1, wherein receiving the extended BFD packet comprises:

receiving the extended BFD packet transmitted periodically; and/or receiving the extended BFD packet transmitted in a request manner, and receiving the extended BFD packet transmitted in the request manner is specifically: receiving the extended BFD packet comprising request information transmitted, or receiving the extended BFD packet comprising response information transmitted when receiving the extended BFD packet comprising the request information.

3. The method for measuring network performance parameters according to claim 1, wherein the value field of the packet loss monitoring TLV further comprises a receive count and a return count, wherein the receive count is the number of the data packets that have been received when the extended BFD packet is received last time; and the return count is a value of the transmit count in the extended BFD packet received last time;

and/or the value field of the packet loss monitoring TLV further comprises a transmit sequence number (Sequence) of the extended BFD packet.

4. The method for measuring network performance parameters according to claim 1, wherein the value field of the time delay monitoring TLV further comprises a receive timing and a return timing, wherein the receive timing is a local time when the extended BFD packet is received last time; and the return timing is a value of the transmit timing in the extended BFD packet received last time;

and/or the value field of the time delay monitoring TLV further comprises a transmit sequence number (Sequence) of the extended BFD packet.

5. The method for measuring network performance parameters according to claim 1, wherein receiving the extended BFD packet that comprises the packet loss monitoring TLV and/or the time delay monitoring TLV comprises:

receiving the extended BFD packet with a Poll (P) field being set to mark that the extended BFD packet comprises the packet loss monitoring TLV and/or the time delay monitoring TLV; or receiving the extended BFD packet with an Authentication Present (A) field being set to mark that the extended BFD packet comprises the packet loss monitoring TLV and/or the time delay monitoring TLV; or receiving the extended BFD packet with a Diagnostic (Diag) part being set to mark that the extended BFD packet comprises the packet loss monitoring TLV and/or the time delay monitoring TLV.

6. The method for measuring network performance parameters according to claim 1, wherein the received extended BFD packet is encapsulated, and the encapsulation specifically comprises:

encapsulating the extended BFD packet with a Generic Associated Channel Header (GE-ACH) defined in a Multi-Protocol Label Switching Transport Profile (MPLS-TP); and if network performance parameters of a Multi-Protocol Label Switching (MPLS) Label Switched Path (LSP) are measured, further encapsulating the extended BFD with a Label for yoU (LFU) defined in the MPLS-TP.

7. The method for measuring network performance parameters according to claim 3, further comprising:

calculating far-end packet loss, and calculating the far-end packet loss is specifically:

when the packet loss monitoring TLV comprises the transmit sequence number or the return counts of the two extended BFD packets are not equal, a far-end packet loss Packet Loss[far-end]=|TxPacketCounter_F [BFD1]−TxPacketCounter_F [BFD2]|−|RxPacketCounter_L [BFD1]−RxPacketCounter_L [BFD2]|, wherein TxPacketCounter_F[BFD1] indicates the return count of the received extended BFD packet BFD1, and the TxPacketCounter_F[BFD2] indicates the return count of the received extended BFD packet BFD2, and RxPacketCounter_L[BFD1] indicates the receive count of the received extended BFD packet BFD1, and the RxPacketCounter_L[BFD2] indicates the receive count of the received extended BFD packet BFD2.

8. The method for measuring network performance parameters according to claim 1, further comprising:

calculating unidirectional time delay jitter, and calculating the unidirectional time delay jitter is calculating a difference between results of two times of the unidirectional time delay.

9. The method for measuring network performance parameters according to claim 4, further comprising:

calculating bidirectional time delay, and calculating the bidirectional time delay is specifically:

a bidirectional time delay Packet Delay [two-way]=(RxTimea−TxTimeStamp_L)−(TxTimeStamp_F−RxTimeStamp_L), wherein RxTimea indicates a local time when the extended BFD packet is received;

TxTimeStamp_L indicates the transmit timing of the received extended BFD packet;

TxTimeStamp_F indicates the return timing of the received extended BFD packet; and RxTimeStamp_L indicates the receive timing of the received extended BFD packet.

10. The method for measuring network performance parameters according to claim 9, further comprising:

calculating bidirectional time delay jitter, and calculating the bidirectional time delay jitter is calculating a difference between results of two times of the bidirectional time delay.

11. The method for measuring network performance parameters according to claim 1, further comprising:

comparing the near-end packet loss and/or the unidirectional time delay with a preset condition, and if the preset condition is met, making a report to a network management system, or performing protection switching, or performing visual management of abnormal link curve drawing.

12. A first device for measuring network performance parameters, the first device comprising:
- an extended bidirectional forwarding detection (BFD) packet receiving module, configured to receive an extended BFD packet transmitted by a second device for measuring network performance parameters, extended BFD packet comprising a packet loss monitoring Type-Length-Value (TLV) and/or a time delay monitoring TLV; and
- a network performance parameter calculating module, configured to calculate near-end packet loss according to the packet loss monitoring TLV and/or unidirectional time delay according to the time delay monitoring TLV in the extended BFD packet;
- wherein a value field of the packet loss monitoring TLV comprises a transmit count, and the transmit count is the number of all data packets that have been transmitted when the extended BFD packet is transmitted;
- wherein a value field of the time delay monitoring TLV comprises a transmit timing, and the transmit timing is a local time when the extended BFD packet is transmitted;
- wherein calculating the near-end packet loss is:
- a near-end packet loss Packet Loss [near-end]=|TxPacketCounter_L[BFD1]−TxPacketCounter_L [BFD2]|−|RxPacketCounterL [BFD1]−RxPacketCounterL [BFD2]|,
- wherein TxPacketCounter_L[BFD1] indicates the transmit count of the received extended BFD packet BFD1, TxPacketCounter_L[BFD2] indicates the transmit count of the received extended BFD packet BFD2, RxPacketCounterL[BFD1] indicates the number of data packets that have been received by calculating equipment when the extended BFD packet BFD1 is received, and RxPacketCounterL[BFD2] indicates the number of data packets that have been received by calculating equipment when the extended BFD packet BFD2 is received;
- wherein calculating the unidirectional time delay is: adding a difference between a local time when the extended BFD packet is received and the transmit timing of the extended BFD packet and a time difference of the first device and the second device.

13. The first device for measuring network performance parameters according to claim 12, further comprising:
- an extended BFD packet transmitting module, configured to transmit the extended BFD packet comprising the packet loss monitoring TLV and/or the time delay monitoring TLV; wherein
- the extended BFD packet receiving module is further configured to notify the extended BFD packet transmitting module, when receiving the extended BFD packet comprising request information.

14. The first device for measuring network performance parameters according to claim 12, wherein the extended BFD packet transmitting module comprises:
- a packet transmit counter, configured to count the number of data packets transmitted.

15. The first device for measuring network performance parameters according to claim 14, wherein the extended BFD packet transmitting module further comprises:
- an extended BFD packet sequence number setter, configured to set a sequence number of the extended BFD packet.

16. The first device for measuring network performance parameters according to 12, wherein the extended BFD packet receiving module comprises:
- a packet receive counter, configured to count the number of data packets received; and
- a packet receive state storage, configured to store a local time when the extended BFD packet is received and a count value of the packet receive counter.

* * * * *

UNITED STATES PATENT AND TRADEMARK OFFICE
CERTIFICATE OF CORRECTION

| | | |
|---|---|---|
| PATENT NO. | : 8,570,893 B2 | Page 1 of 1 |
| APPLICATION NO. | : 13/093438 | |
| DATED | : October 29, 2013 | |
| INVENTOR(S) | : Xinchun Guo and Jian Li | |

It is certified that error appears in the above-identified patent and that said Letters Patent is hereby corrected as shown below:

In the Specification

Column 2, line 30, delete "TIN" and insert -- TLV --;
Column 4, line 41, after "so" insert -- as --;
Column 5, line 61, after "BFD1" insert -- and --;
Column 9, line 57, delete "off" and insert -- of --; and
Column 10, line 57, delete "BPD" and insert -- BFD --.

Signed and Sealed this
Seventh Day of October, 2014

Michelle K. Lee
*Deputy Director of the United States Patent and Trademark Office*